US012032925B1

United States Patent
Kim et al.

(10) Patent No.: US 12,032,925 B1
(45) Date of Patent: Jul. 9, 2024

(54) LATENCY PROCESSING UNIT

(71) Applicant: HyperAccel Co., Ltd., Gyeonggi-do (KR)

(72) Inventors: Jung-Hoon Kim, Gyeonggi-do (KR); Junseo Cha, Gyeonggi-do (KR); Gyubin Choi, Gyeonggi-do (KR)

(73) Assignee: HyperAccel Co., Ltd. (KR)

( * ) Notice: Subject to any disclaimer, the term of this patent is extended or adjusted under 35 U.S.C. 154(b) by 0 days.

(21) Appl. No.: 18/391,328

(22) Filed: Dec. 20, 2023

(30) Foreign Application Priority Data

Apr. 12, 2023 (KR) .......................... 10-2023-0048352

(51) Int. Cl.
*G06F 7/52* (2006.01)
*G06F 7/487* (2006.01)
*G06F 7/523* (2006.01)
*G06F 17/16* (2006.01)

(52) U.S. Cl.
CPC .............. *G06F 7/523* (2013.01); *G06F 7/487* (2013.01); *G06F 7/4876* (2013.01); *G06F 17/16* (2013.01)

(58) Field of Classification Search
CPC ........ G06F 7/523; G06F 17/16; G06F 7/4876; G06F 7/52; G06F 9/3893; G06F 15/7821; G06F 7/487; G06F 16/3347; G06F 7/4983
See application file for complete search history.

(56) References Cited

U.S. PATENT DOCUMENTS

| | | | | |
|---|---|---|---|---|
| 2022/0113975 A1* | 4/2022 | Lucia | .................. | G06F 9/3802 |
| 2022/0236949 A1* | 7/2022 | Song | .................. | G06F 7/50 |
| 2022/0374492 A1* | 11/2022 | Ware | .................. | G06F 7/5443 |
| 2022/0405349 A1* | 12/2022 | Zhang | .................. | G06N 3/02 |
| 2022/0414443 A1* | 12/2022 | Li | .................. | G06N 3/048 |
| 2023/0153265 A1* | 5/2023 | Master | .................. | G06F 7/487 712/10 |

FOREIGN PATENT DOCUMENTS

| KR | 10-2021-0134081 | 11/2021 |
|---|---|---|
| KR | 10-2021-0148586 | 12/2021 |
| KR | 10-2022-0078290 | 6/2022 |
| KR | 10-2023-0005348 | 1/2023 |

OTHER PUBLICATIONS

Korean Office Action for KR 10-2023-0048352, dated Jun. 30, 2023.
Korean Notice of Allowance for KR 10-2023-0048352, dated Aug. 31, 2023.

* cited by examiner

*Primary Examiner* — Vibol Tan
(74) *Attorney, Agent, or Firm* — Christensen O'Connor Johnson Kindness PLLC (57) ABSTRACT

Provided is a latency processing unit. The latency processing unit may include a plurality of multiplier-accumulator (MAC) trees configured to perform a matrix product operation for at least one of a plurality of partitions that implement an artificial intelligence (AI) model, streamlined memory access configured to connect each of the plurality of MAC trees to high bandwidth memory in which the at least one partition has been stored through a plurality of channels, a vector execution engine configured to perform an additional operation on results of the operation of the plurality of MAC trees, a local memory unit configured to store the results of the operation of the vector execution engine and an activation value, and an instruction scheduling unit configured to schedule the operations of the plurality of MAC trees and the vector execution engine.

12 Claims, 9 Drawing Sheets

LATENCY PROCESSING UNIT

CROSS-REFERENCE TO RELATED APPLICATION

This application is based on and claims priority under 35 U.S.C. 119 to Korean Patent Application No. 10-2023-0048352, filed on Apr. 12, 2023, in the Korean intellectual property office, the disclosures of which are herein incorporated by reference in their entireties.

TECHNICAL FIELD

Embodiments of the present disclosure relate to a latency processing unit (LPU), and more particularly, to an LPU capable of optimizing a computational load and a delay time for an operation of a hyper-scale artificial intelligence (AI) model by maximizing the use of an external memory bandwidth through streamlined memory access (SMA) and a streamlined execution engine (SXE).

BACKGROUND OF THE DISCLOSURE

As the machine learning technology is recently developed, the range to which an artificial intelligence (AI) application is applied is increased. Such an AI model requires various and complicated operations in order to obtain a higher degree of accuracy. As the size of the model is gradually increased, a hyper-scale AI model comes to the stage. Accordingly, the importance of an accelerator for processing such a hyper-scale AI model comes to the fore.

In particular, natural language processing applications, such as an AI translator and a chatbot, basically use a generation model based on a transformer model using an attention operation. The generation models based on the transformer model have dependency on the time. The attention operations that are basically used have dependency therebetween. Accordingly, there is a difficulty in parallelizing and accelerating the generation models based on the transformer model. Furthermore, not only a computational load, but a delay time is very important for applications using the generation model because a real-time service for the applications is a very important.

However, hardware accelerators having a computational load maximized by using data parallelism like the existing graphics processing unit (GPU) are not suitable for processing the acceleration of an application using a hyper-scale AI model. Furthermore, the hyper-scale AI models may have a data bottleneck phenomenon in the existing hardware accelerator structure because the size of data in the hyper-scale AI model is very large. Accordingly, there is a need for a new hardware accelerator structure in order to accelerate the hyper-scale AI model.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments may provide an LPU capable of optimizing a computational load and a delay time for an operation of a hyper-scale artificial intelligence (AI) model by maximizing the use of an external memory bandwidth through streamlined memory access (SMA) and a streamlined execution engine (SXE).

Technical objects of the present disclosure are not limited to the aforementioned objects, and the other objects not described above may be evidently understood from the following description by those skilled in the art.

There is provided a latency processing unit, including a plurality of multiplier-accumulator (MAC) trees configured to perform a matrix product operation for at least one of a plurality of partitions that implement an artificial intelligence (AI) model, streamlined memory access configured to connect each of the plurality of MAC trees to high bandwidth memory in which the at least one partition has been stored through a plurality of channels, a vector execution engine configured to perform an additional operation on results of the operation of the plurality of MAC trees, a local memory unit configured to store the results of the operation of the vector execution engine and an activation value, and an instruction scheduling unit configured to schedule the operations of the plurality of MAC trees and the vector execution engine.

According to an aspect, each of the plurality of MAC trees may be connected to the plurality of channels of the high bandwidth memory in a one-to-one way.

According to another aspect, a read interface of the streamlined memory access only consists of data path from the high bandwidth memory to the MAC trees, and a write interface only consists of data path from the register file to the high bandwidth memory, so that unnecessary data traffic is removed.

According to still another aspect, the local memory unit may read the activation value and a model parameter from the high bandwidth memory and may transmit the activation value and the model parameter to the plurality of MAC trees and the vector execution engine.

According to still another aspect, the local memory unit may copy and transmit an identical activation value to each of the plurality of MAC trees.

According to still another aspect, the high bandwidth memory may store a weight matrix so that the weight matrix is mapped to the plurality of channels as much as the number of pluralities of MAC trees in a column direction.

According to still another aspect, the instruction scheduling unit may include a multi-bank register file scoreboard and scheduling controller. The multi-bank register file scoreboard may conduct data dependency check based on the operand address and result address of subsequent instructions, and scheduling controller determines whether to hold or issue the instructions for data movement from the host computer or from high bandwidth memory or for data computation in the plurality of MAC trees and the vector execution engine with reference to the multi-bank register file scoreboard.

According to still another aspect, the latency processing unit may further include a peripheral component interconnect express (PCIe) interface configured to connect a host computer and the latency processing unit in order to receive at least one of an instruction, an input value, and a weight from the host computer.

According to still another aspect, the latency processing unit may further include a peer to peer (P2P) interface for a connection with a plurality of latency processing units corresponding to at least one different partitions of the plurality of partitions, respectively.

According to still another aspect, the latency processing unit may be implemented as a chip having a processing-in-memory (PIM) structure capable of operating within the high bandwidth memory.

According to still another aspect, the latency processing unit may be implemented as a buffer chip having a processing-near-memory (PNM) structure capable of operating with respect to a plurality of pieces of high bandwidth memory in which the plurality of partitions has been stored, respectively.

According to still another aspect, the plurality of MAC trees may be implemented in a chip having a PIM structure capable of operating within the high bandwidth memory. The streamlined memory access, the vector execution engine, the local memory unit, and the instruction scheduling unit may be implemented in a buffer chip having a PNM structure capable of operating with respect to a plurality of pieces of high bandwidth memory in which the plurality of partitions has been stored, respectively.

The details of other embodiments are included in the detailed description and the drawings.

A computational load and a delay time for an operation of a hyper-scale AI model can be optimized by maximizing the use of an external memory bandwidth for the SMA and the SXE.

Effects of the present disclosure are not limited to the aforementioned effects, and other effects not described above may be evidently understood by those skilled in the art from the claims.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Advantages and characteristics of the present disclosure and a method for achieving the advantages and characteristics will become apparent from the embodiments described in detail later in conjunction with the accompanying drawings. However, the present disclosure is not limited to the disclosed embodiments but may be implemented in various different forms. The embodiments are merely provided to complete the present disclosure and to fully notify a person having ordinary knowledge in the art to which the present disclosure pertains of the category of the present disclosure. The disclosure is defined by the category of the claims. Throughout the specification, the same reference numerals denote the same components.

When it is described that one component is "connected to" or "coupled to" the other component, it means that the one component may be directly connected, or coupled to the other component, or a third component may be interposed between the two components. In contrast, when it is described that one component is "directly connected to" or "directly coupled" to" the other component, it means that a third component is not interposed between the two components. The term "and/or" includes each of mentioned items or all combinations of one or more of the mentioned items.

Terms used in the specification are provided to describe the embodiments and are not intended to limit the present disclosure. In the specification, the singular form, unless specially described otherwise, may include the plural form. Furthermore, terms, such as "includes" and/or "including" used in the specification, do not exclude the existence or addition of one or more components, steps, operations and/or devices in the described components, steps, operations and/or devices.

Although a first, a second, etc. are used to describe various elements or components, these elements or components are not limited by such terms. The terms are used to merely distinguish between one component or component and another component or component. Accordingly, a first component or component described hereinafter may be a second component or component within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessive unless specially defined otherwise.

Figure 1:
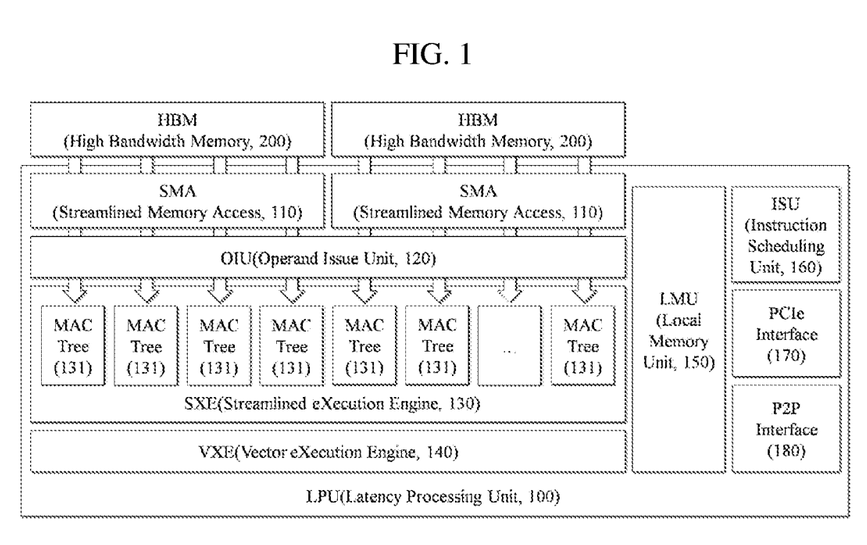
FIG. 1 is a diagram illustrating an example of a structure of a latency processing unit (LPU) according to an embodiment of the present disclosure.

FIG. 1 is a diagram illustrating an example of a structure of a latency processing unit (LPU) according to an embodiment of the present disclosure.

Referring to FIG. 1, the LPU 100 according to an embodiment of the present disclosure may include streamlined memory access (SMA) 110, an operand issue unit (OIU) 120, a streamlined execution engine (SXE) 130, a vector execution engine (VXE) 140, a local memory unit (LMU) 150, an instruction scheduling unit (ISU) 160, a peripheral component interconnect express (PCIe) interface 170, and a peer to peer (P2P) interface 180.

The SMA 110 may be special type of direct memory access (DMA). For example, the SMA 110 may transmit half-precision floating point (FP16) data in a maximum bandwidth by connecting all channels (e.g., 32) of high bandwidth memory (HBM) 200 to an execution engine (e.g., SXE 130). The SMA 110 may be designed in the form of deep first in first out (FIFO) in order to transmit a consecutive memory request in response to a pre-loaded memory (MEM) instruction. Memory mapping in which hardware has been taken into consideration may reduce a delay time by removing at least one of reshaping, switching, and preprocessing of a matrix. Accordingly, the SMA 110 may stream data that are received with a maximum burst size to the execution engine with minimum latency. The SMA 110 may also efficiently execute the transpose of a matrix by using a strobe signal. The streaming data may include parameters for vector matrix execution (e.g., a weight or a bias) and other vector-related execution (e.g., gamma/beta or embedding).

The OIU 120 may adjust data (e.g., a first operand) streamlined by the SMA 110 and an input (e.g., a second operand) in on-chip memory, before issuing the first operand and the second operand to the execution engine (e.g., the SXE 130). Based on the execution (EXE) instruction, the OIU 120 may construct the execution engine and generate a microcode to configure a target operation for the operands. Furthermore, a reuse buffer may be disposed in the OIU 120 in order to remove the read waiting time of a static operand (e.g., an input vector). An asymmetrical buffer may be disposed in the OIU 120 in order to temporarily store vectorized data that is distributed as a scalars (e.g., a bias). Accordingly, a proper operand is pre-fetched almost all the time and prepared to be immediately issued to the execution engine.

The SXE 130 is major computing hardware of the LPU 100 and may be designed to fully utilize the received bandwidth in order to execute vector-matrix multiplication (V. M), such as attention, 1D convolution, and a feed forward network. The SXE 130 may include a number of multiply-accumulate (MAC) tree 131 with specific vector dimensions to exactly matching the incoming HBM bandwidth and the operation bandwidth. For example, if the SXE 130 receives 1024 elements from the HBM 200 every cycle, the SXE 130 may match the incoming HBM bandwidth and the operation bandwidth through the 16 MAC trees 131 having 64 input vectors. Furthermore, the MAC trees 131 having the 64 input vectors may consist of 64 multipliers and 63 adders.

The plurality of MAC trees 131 may perform a matrix product operation and may be connected for each channel through the HBM 200, that is, high bandwidth memory that is external memory, and the SMA 110. Specifically, one of the pluralities of MAC trees 131 is connected to the HBM 200 through a designated memory channel, and can maximize the bandwidth utilization between the LPU 100 and the HBM 200 to perform the matrix product operation necessary for a hyper-scale AI model without a bottleneck phenomenon. Accordingly, the plurality of MAC trees 131 and the memory channels of the HBM 200 may be constructed to have the same number.

The results of the matrix product operation of the plurality of MAC trees 131 may be provided to the VXE 140. The VXE 140 may be implemented by using an configurable arithmetic logic unit (ALU), and may execute vector tasks, such as token embedding, softmax, normalization, and a residual operation. Such a vector task occurs relatively less frequently. Accordingly, hardware resources can be reduced with a negligible performance loss by adjusting fan-in from the OIU 120 to this path. The VXE 140 may receive the results of the operation of the plurality of MAC trees 131, and may also receive an activation value from the LMU 150 to perform a subsequent operation. The VXE 140 may be constructed to execute a combination of various operators by including a plurality of multi-function operation data paths.

The LMU 150 may transmit the activation value to the plurality of MAC trees 131 and the VXE 140. In this case, the LMU 150 may duplicate and transmit the activation value in order to transmit the same activation value to the plurality of MAC trees 131. Furthermore, the LMU 150 may store result values of the operations of the plurality of MAC trees 131 and the VXE 140. In other words, the LMU 150 may function within the LPU 100 as an internal buffer corresponding to the HBM 200. In this case, the LPU 100 may store an activation value and/or parameter of the model having high reusability in the matrix product operation in the LMU 150, and may store a weight having low reusability in the HBM 200. The LMU 150 may be implemented in the form of a 4 MB-multi-bank register file having scalar vector separation for the fast and high bandwidth access of an input, an output, and intermediate data. Furthermore, the LMU 150 may be a multi-port that supports simultaneous read from the OIU 120 and write from the writeback stabe of the execution engine.

The ISU 160 may control an overall execution flow of the LPU 100. The ISU 160 may use a parallel instruction chaining (PIC) method. If the PIC is used, dependent instructions can be consecutively executed. If the PIC is used, minimum control overhead and the reduction of a waiting time can be achieved because an instruction that requires independent hardware is separated into a group of dependent instructions (e.g., a memory (MEM) instruction, execution (EXE) instruction, and a network (NET) instruction) and all of the instructions are executed in parallel to an instruction chain of each group. The ISU 160 may also update control registers (e.g., a token and a layer number) for engine execution. An internal scheduler supports the out-of-order execution of the SXE 130 and the VXE 140 in order to maximize hardware utilization. A comprehensive data dependency check may be applied by the multi-back register file scoreboard to avoid data hazard. For example, the ISU 160 may schedule the plurality of MAC trees 131 and the VXE 140 so that the plurality of MAC trees 131 and the VXE 140 can simultaneously perform operation. Furthermore, the ISU 160 can improve a computational load and a latency time by minimizing the idle time of each compute unit and data movement unit in a way to previously execute an instruction not having dependency in order to maximize parallel operations.

The LPU 100 may be connected to a host computer through the PCIe interface 170. The LPU 100 may receive an instruction necessary for an operation of the LPU 100, an input value of the hyper-scale AI model, and a weight from the host computer, may perform an operation on the received instruction, input value, and weight, and may transmit the results of the operation to the host computer.

The LPU 100 may be scaled out to a cluster of the plurality of LPUs connected through the P2P interface 180. An extended cluster structure can further improve the acceleration of an operation of the hyper-scale AI model.

FIGS. 2 to 5 are diagrams illustrating examples of implementation models of the LPUs according to embodiments of the present disclosure. In the embodiment of FIG. 1, an example of an implementation model using external memory of the HBM 200 has been described. Memory having a double data rate (DDR) may be used as the external memory instead of the HBM 200. In this case, a large model may be separated into a plurality of partitions because it is difficult to store the large model in one device. The plurality of partitions may be stored for each partition in pieces of external memory for a plurality of devices (i.e., a plurality of LPUs). In this case, synchronization between the plurality of devices may be required for the inference of the large model.

Figure 2:
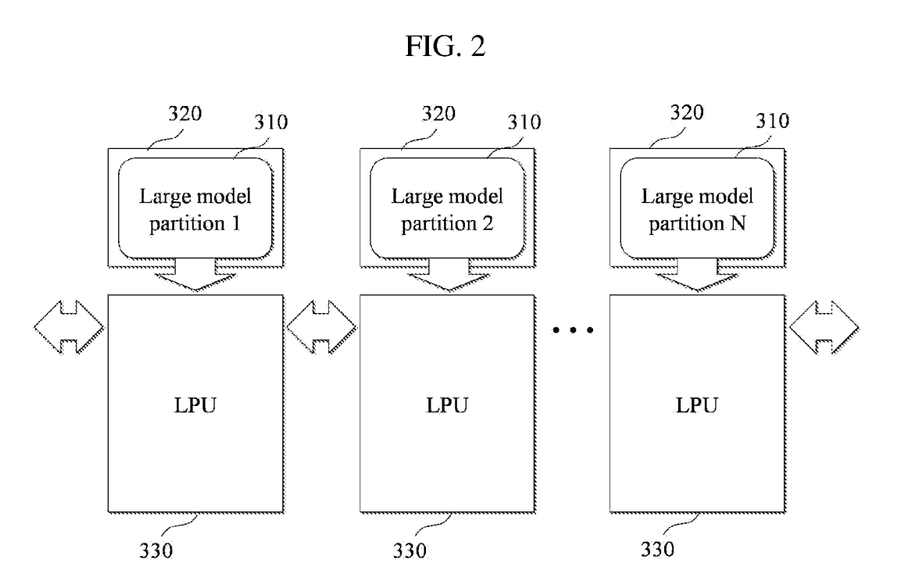
FIGS. 2 to 5 are diagrams illustrating examples of implementation models of LPUs according to embodiments of the present disclosure.

As described in the embodiment of FIG. 1, a plurality of pieces of external memory 320 that store the plurality of partitions 310 of the large model and a plurality of LPUs 330 connected to the plurality of pieces of external memory 320 in parallel are illustrated in the embodiment of FIG. 2. One LPU may be implemented in one field programmable gate array (FPGA). One partition may be connected to one FPGA in parallel. A transformer structure includes multi-head attention, layer normalization, and feed forward within a decoder layer. The multi-head attention and the feed forward may be partitioned by model parallelism. In this case, when the multi-head attention is terminated, one embedding vector may be output as a result. Since one device has only a portion of the embedding vector, synchronization may be required between the plurality of devices because the devices need to share each embedding vector in order to proceed to a next operation. In this case, if scalability is taken into consideration, one LPU may be implemented in a form having a plurality of pieces of external memory (e.g., 2 or 4). For example, the embodiment of FIG. 1 illustrates an example in which two pieces of HBM 200 in each of which one partition has been stored have been used.

Figure 3:
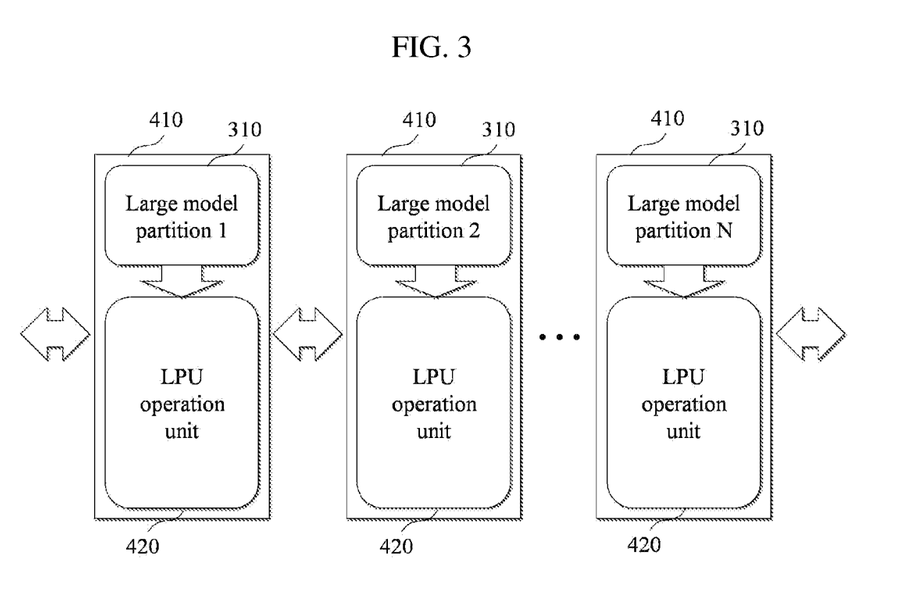

An embodiment of FIG. 3 is an example of a processing-in-memory (PIM) model and illustrates an example in which one LPU has been implemented as a PIM chip and all of partitions and LPU operation units have been implemented in a form in which the partitions and the LPU operation units have been integrated in one chip. The embodiment of FIG. 3 illustrates a plurality of LPUs 410 each of which may be implemented as each PIM chip, a plurality of partitions 310, and a plurality of LPU operation units 420. In this case, each of the plurality of LPUs 410 may include one partition and one LPU operation unit.

Figure 4:
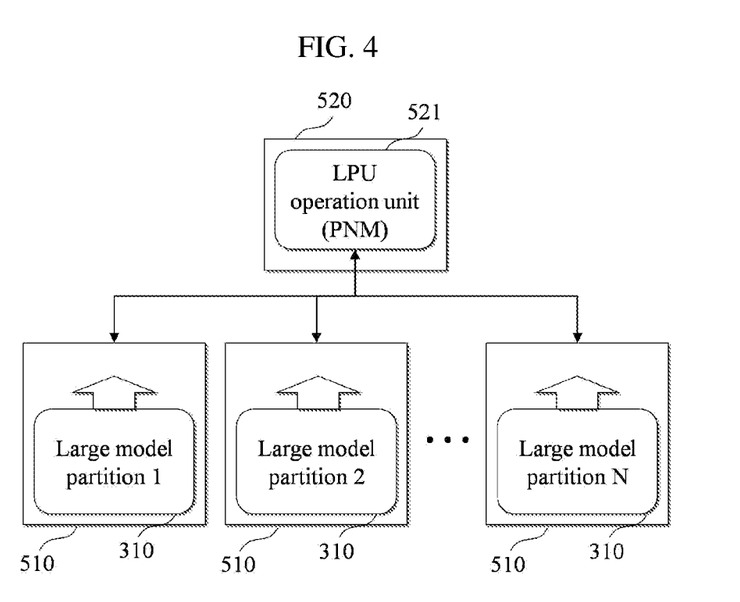

An embodiment of FIG. 4 illustrates an example of a processing-near-memory (PNM) model. It may be difficult to include a construction for processing all LPU operations within one PIM chip. The embodiment of FIG. 4 illustrates a model having a form in which the plurality of partitions 310 is stored in a plurality of memory chips 510, respectively, and a buffer chip 520, such as a PNM chip, includes an LPU operation unit 521 for an operation of an LPU.

Figure 5:
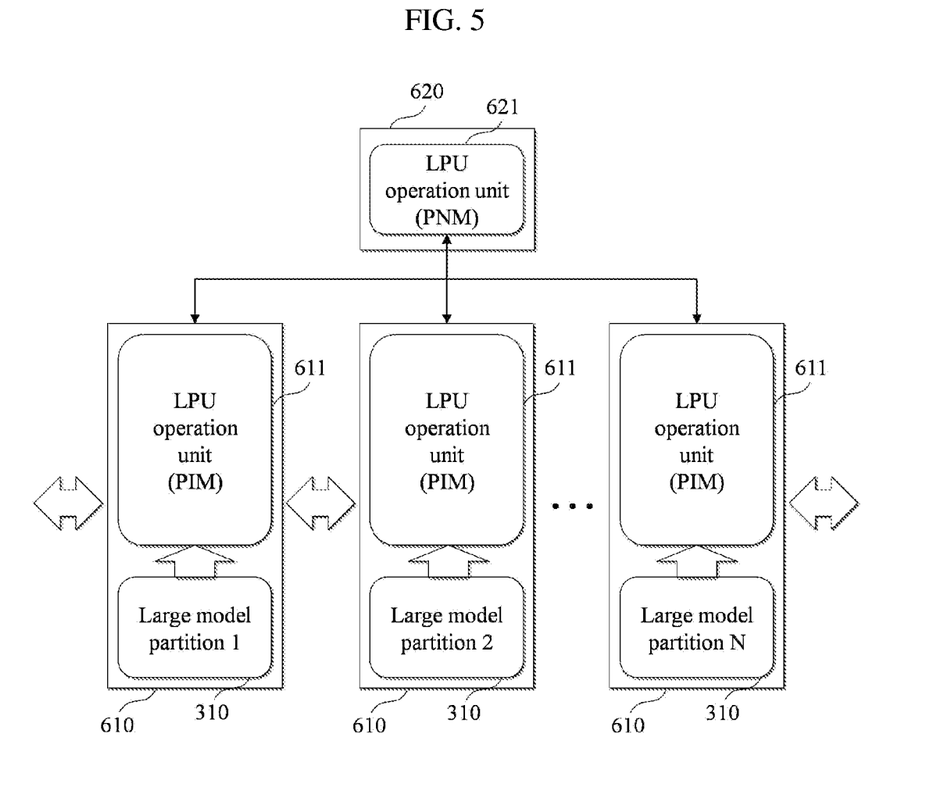

An embodiment of FIG. 5 illustrates an example of a model in which a PIM and a PNM are combined. For example, the plurality of partitions 310 may be stored in a plurality of memory chips 610, respectively. Furthermore, an LPU operation unit 611 using a PIM method may be implemented in each of the plurality of memory chips 610 as an accumulator, such as a MAC tree. In this case, an LPU operation unit 621 for the remaining high-level operation of an LPU may be implemented in the buffer chip 620 according to the PNM method.

Figure 6:
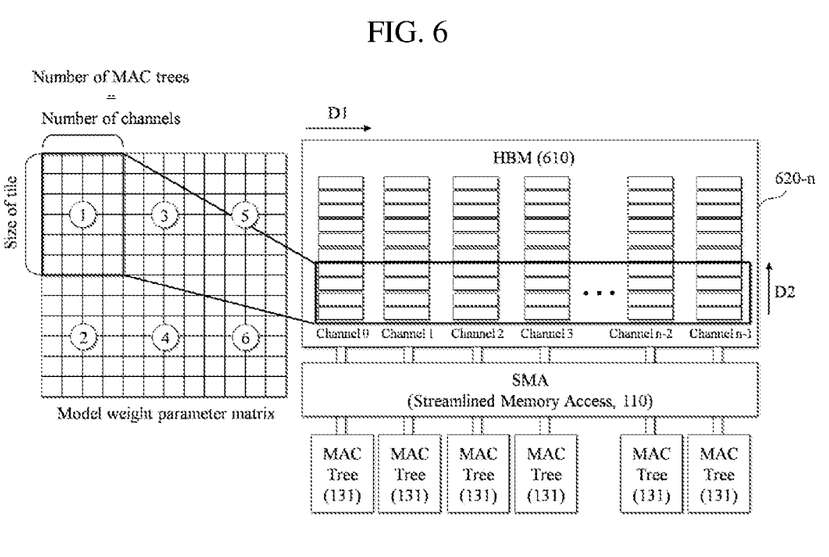
FIG. 6 is a diagram for describing the mapping of the data of a weight matrix of high bandwidth memory for a matrix product operation of the LPU according to an embodiment of the present disclosure.

FIG. 6 is a diagram for describing the mapping of the data of a weight matrix of high bandwidth memory for a matrix product operation of the LPU according to an embodiment of the present disclosure.

Referring to FIG. 6, the LPU 100, according to the present embodiment, may map the data of the weight matrix in an HBM 610, such as the HBM 200, such that specific memory channel is designated to a specific MAC tree 131, and the total bandwidths of the HBM and the plurality of MAC trees are equivalent. The weight data may be fetched and stored without ever needing to access unnecessary memory channel upon matrix product operation.

Specifically, the data of the weight matrix may be stored in the HBM 610 so that the data of the weight matrix are mapped to channels 620-$n$, respectively, by the number of pluralities of MAC trees 131 in a column direction D1 of the weight matrix. The plurality of MAC trees 131 may read column direction data from the memory channels 620-$n$ allocated thereto, respectively, and perform matrix product operations because the matrix product operations may be performed in parallel in the column direction in the weight matrix.

Thereafter, the data of the weight matrix may be mapped so that the plurality of MAC trees 131 can complete the final operation results by accumulating the data in a row direction D2 of the weight matrix. The number of row data that are mapped at once may be determined based on a bandwidth of the HBM 610. This may be determined as the size of a tile which may be processed by the plurality of MAC trees 131 at once.

Figure 7:
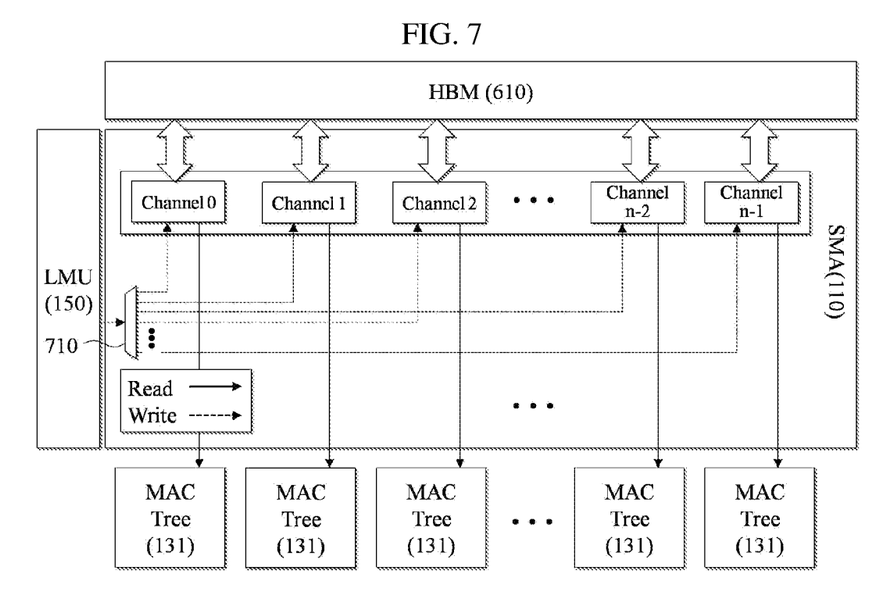
FIG. 7 is a diagram for describing a high bandwidth memory interface included in the LPU according to an embodiment of the present disclosure.

FIG. 7 is a diagram for describing an HBM interface included in the LPU according to an embodiment of the present disclosure.

Referring to FIG. 7, the SMA 110 may connect the LMU 150, the plurality of MAC trees 131, and the HBM 610. The SMA 110 is not connected to other operation units of the LPU 100. Accordingly, the HBM interface can be minimized in terms of hardware resources.

The plurality of MAC trees 131 and the memory channels 620-$n$ may be connected, respectively, in a one-to-one manner. That is, the plurality of MAC trees 131 do not need to access another channel other than channels that have been directly allocated thereto, and thus can perform matrix product operations without using a complicated interface, such as a cross bar that has a long latency and requires high hardware resource.

The SMA 110 may construct only a read interface through which the plurality of MAC trees 131 fetches the data of a weight matrix stored in the HBM 610. In other words, as will be described later, the results of the operation are stored in the HBM 610 through the LMU 150. Accordingly, a write interface for the HBM 610 of the plurality of MAC trees 131 is not constructed, and hardware resources can be reduced that much.

In contrast, the SMA 110 may construct only a write interface between the LMU 150 and the HBM 610. The results of the operation stored in the LMU 150 as an internal buffer may be transmitted through the SMA 110 in order to be stored on the HBM 610. A memory channel, that is, a target storage space, may be selected by using a demultiplexer 710.

Figure 8:
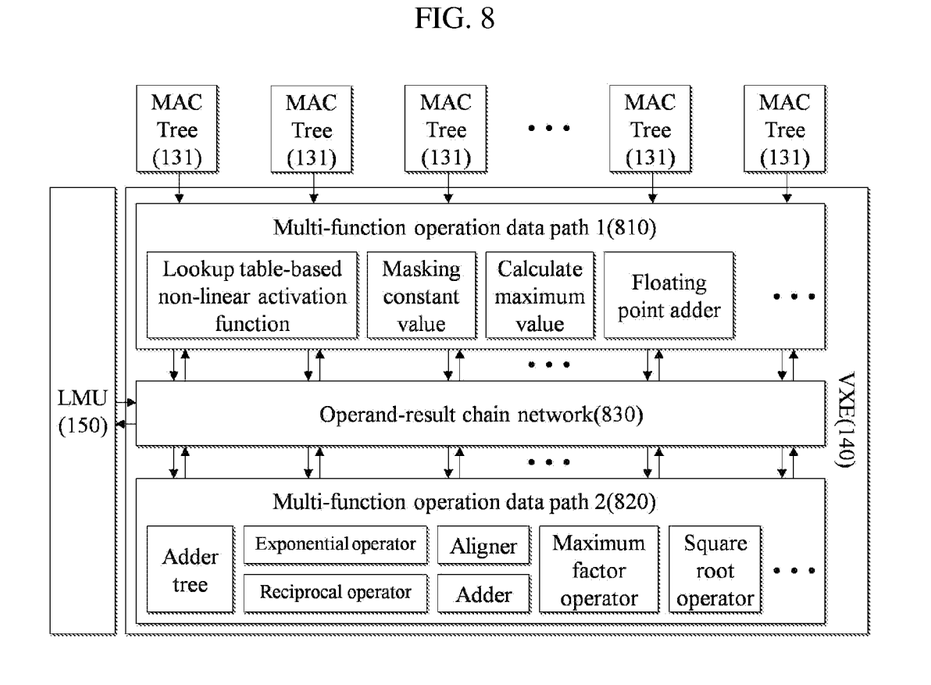
FIG. 8 is a diagram for describing a reconfigurable multi-function operation unit included in the LPU according to an embodiment of the present disclosure.

FIG. 8 is a diagram for describing a reconfigurable multi-function operation unit included in the LPU according to an embodiment of the present disclosure.

Referring to FIG. 8, the VXE 140 may include a plurality of multi-function operation data paths 810 and 820. The plurality of multi-function operation data paths 810 and 820 may be connected to an operand-result chain network 830 to construct various operator combinations.

As illustrated in FIG. 8, the plurality of multi-function operation data paths 810 and 820 may include various operation units that are necessary for a lookup table-based non-linear activation function and a masking operation, etc. for example. The construction of the operation units of the reconfigurable multi-function operation data paths 810 and 820 illustrated in FIG. 8 are exemplary. An additional operation unit necessary for a large model operation may also be included in the multi-function operation data paths 810 and 820. The results of operations of the VXE 140 may be transmitted to the LMU 150.

Figure 9:
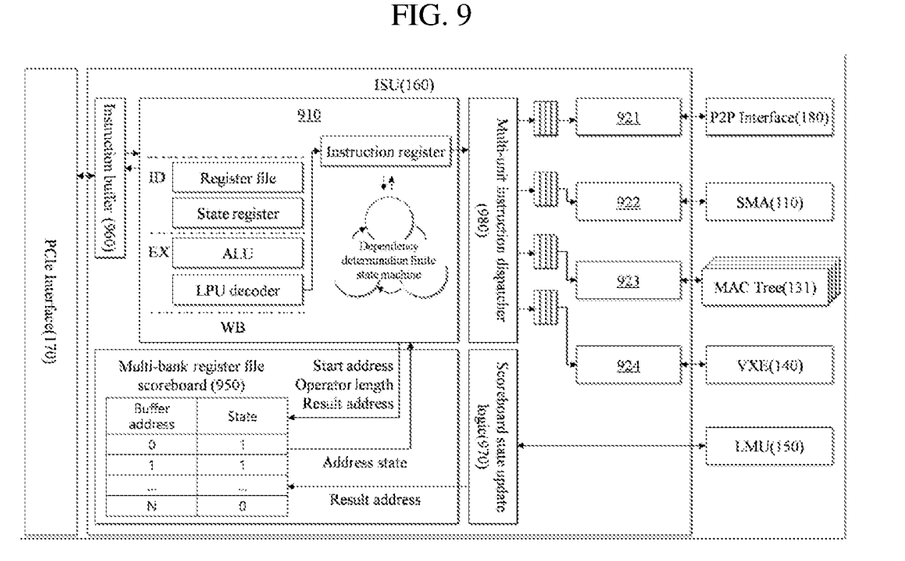
FIG. 9 is a diagram for describing a construction of an address-based multi-unit scheduler with out-of-order execution capabilities included in the LPU according to an embodiment of the present disclosure.

FIG. 9 is a diagram for describing a construction of an address-based multi-unit scheduler with out-of-order execution capabilities included in the LPU according to an embodiment of the present disclosure.

Referring to FIG. 9, the ISU 160 as the address-based out-of-order execution multi-unit scheduler included in the LPU 100 according to the present embodiment may include an address-based instruction dependency determination and scheduling controller 910, a plurality of instruction issue controllers 921, 922, 923, and 924, a multi-bank register file scoreboard 950, an instruction buffer 960, a scoreboard state update logic 970, and a multi-unit instruction dispatcher 980.

The ISU 160 may simultaneously operate compute units and data movement units through the address-based instruction dependency determination and scheduling controller 910 and the plurality of instruction issue controllers 921, 922, 923, and 924. In this case, the ISU 160 may change the states of an operand address and result address of the multi-bank register file scoreboard 950 into 1 based on the instruction that is being executed or to be executed on each compute unit.

The multi-bank register file scoreboard 950 may change the state of the result address of an instruction the execution of which has been completed into 0 through the scoreboard state update logic 970.

The address-based instruction dependency determination and scheduling controller 910 may determine dependency between an instruction to be executed and an instruction that is being executed and dependency between instructions to be executed, with reference to the states of addresses through the multi-bank register file scoreboard 970. Accordingly, the idle times of each compute units and each data movement unit can be minimized because an instruction not having dependency can be preprocessed.

The address-based instruction dependency determination and scheduling controller 910 included in the ISU 160 may load an instruction from the instruction buffer 960 and process the instruction. In this case, the address-based instruction dependency determination and scheduling controller 910 may execute a loop instruction, may divide other instructions by decoding the instructions, and may transmit the instructions to a device-to-device instruction issue controller 921, a direct memory access instruction issue controller 922, an MAC tree instruction issue controller 923, and a reconfigurable multi-function operation unit instruction issue controller 924 through the multi-unit instruction dispatcher 980.

The ISU 160 receives instructions of the LPU 100 from the host computer through the PCIe interface 170, stores the received instructions, and may store a current state of the LPU 100 in a state register. The host computer may check a corresponding state register through the PCIe interface 170.

Although embodiments of the present disclosure have been described above with reference to the accompanying drawings, a person having ordinary knowledge in the art to which the present disclosure pertains will appreciate that the present disclosure may be implemented in other detailed forms without departing from the technical spirit or essential characteristics of the present disclosure. Accordingly, the aforementioned embodiments should be construed as being only illustrative but should not be construed as being restrictive from all aspects.

DESCRIPTION OF REFERENCE NUMERALS

100: latency processing unit (LPU)
110: streamlined memory access (SMA)
120: operand issue unit (OIU))
130: streamlined execution engine (SXE)
131: plurality of multiplier-accumulator (MAC) trees
140: vector execution engine (VXE)
150: local memory unit (LMU)
160: instruction scheduling unit (ISU)
170: peripheral component interconnect express (PCIe) interface
180: peer to peer (P2P) interface The embodiments of the disclosure in which an exclusive property or privilege is claimed are defined as follows:

1. A latency processing unit comprising:
   a plurality of multiplier-accumulator (MAC) trees configured to perform a matrix product operation for at least one of a plurality of partitions that implement an artificial intelligence (AI) model;
   streamlined memory access configured to connect each of the plurality of MAC trees to high bandwidth memory in which the at least one partition has been stored through a plurality of channels;
   a vector execution engine configured to perform an additional operation on results of the operation of the plurality of MAC trees;
   a local memory unit configured to store the results of the operation of the vector execution engine and an activation value; and
   an instruction scheduling unit configured to schedule the operations of the plurality of MAC trees and the vector execution engine.

2. The latency processing unit of claim 1, wherein each of the plurality of MAC trees is connected to the plurality of channels of the high bandwidth memory in a one-to-one way.

3. The latency processing unit of claim 1, wherein the streamlined memory access constructs only a read interface between the plurality of MAC trees and the high bandwidth memory and constructs only a write interface between the local memory unit and the high bandwidth memory.

4. The latency processing unit of claim 1, wherein the local memory unit reads the activation value and a model parameter from the high bandwidth memory and transmits the activation value and the model parameter to the plurality of MAC trees and the vector execution engine.

5. The latency processing unit of claim 4, wherein the local memory unit copies and transmits an identical activation value to each of the plurality of MAC trees.

6. The latency processing unit of claim 1, wherein the high bandwidth memory stores a weight matrix so that the weight matrix is mapped to the plurality of channels as much as the number of pluralities of MAC trees in a column direction.

7. The latency processing unit of claim 1, wherein the instruction scheduling unit comprises:
   an address-based instruction dependency determination and scheduling controller, and
   a multi-bank register file scoreboard,
   wherein the address-based instruction dependency determination and scheduling controller determines dependency between instructions of the plurality of MAC trees and the vector execution engine with reference to an operand address and result address of an instruction that has been stored in the multi-bank register file scoreboard.

8. The latency processing unit of claim 1, further comprising a peripheral component interconnect express (PCIe) interface configured to connect a host computer and the latency processing unit in order to receive at least one of an instruction, an input value, and a weight from the host computer.

9. The latency processing unit of claim 1, further comprising a peer to peer (P2P) interface for a connection with a plurality of latency processing units corresponding to at least one different partitions of the plurality of partitions, respectively.

10. The latency processing unit of claim 1, wherein the latency processing unit is implemented as a chip having a processing-in-memory (PIM) structure capable of operating within the high bandwidth memory.

11. The latency processing unit of claim 1, wherein the latency processing unit is implemented as a buffer chip having a processing-near-memory (PNM) structure capable of operating with respect to a plurality of pieces of high bandwidth memory in which the plurality of partitions has been stored, respectively.

12. The latency processing unit of claim 1, wherein:
the plurality of MAC trees is implemented in a chip having a PIM structure capable of operating within the high bandwidth memory, and
the streamlined memory access, the vector execution engine, the local memory unit, and the instruction scheduling unit are implemented in a buffer chip having a PNM structure capable of operating with respect to a plurality of pieces of high bandwidth memory in which the plurality of partitions has been stored, respectively.

* * * * *